(12) United States Patent
Avraham et al.

(10) Patent No.: US 11,272,409 B2
(45) Date of Patent: Mar. 8, 2022

(54) SYSTEMS AND METHODS FOR TRIGGERING A HANDOVER IN WIRELESS COMMUNICATION NETWORKS

(71) Applicant: OMNISTREAM LTD., Ramat Hasharon (IL)

(72) Inventors: Hagay Avraham, Petach Tikva (IL); Avi Mordehay Sharir, Ramat Hasharon (IL); Almog Noyberg, Petach Tikva (IL)

(73) Assignee: OMNISTREAM LTD., Ramat Hasharon (IL)

(*) Notice: Subject to any disclaimer, the term of this patent is extended or adjusted under 35 U.S.C. 154(b) by 15 days.

(21) Appl. No.: 16/956,823

(22) PCT Filed: May 16, 2019

(86) PCT No.: PCT/IL2019/050553
§ 371 (c)(1),
(2) Date: Jun. 22, 2020

(87) PCT Pub. No.: WO2019/244145
PCT Pub. Date: Dec. 26, 2019

(65) Prior Publication Data
US 2020/0404556 A1 Dec. 24, 2020

(30) Foreign Application Priority Data
Jun. 20, 2018 (IL) .......................................... 260171

(51) Int. Cl.
*H04W 4/00* (2018.01)
*H04W 36/00* (2009.01)
(Continued)

(52) U.S. Cl.
CPC .... *H04W 36/00837* (2018.08); *H04B 17/318* (2015.01); *H04W 24/08* (2013.01); *H04W 36/30* (2013.01); *H04W 76/27* (2018.02)

(58) Field of Classification Search
None
See application file for complete search history.

(56) References Cited

U.S. PATENT DOCUMENTS 6,081,713 A 6/2000 Desgagné
6,792,283 B1 9/2004 Roberts et al.
(Continued)

FOREIGN PATENT DOCUMENTS

EP 1081974 3/2001
WO 9805175 2/1995
WO 2009076619 6/2009

OTHER PUBLICATIONS

International Search Report and Written Opinion of the Searching Authority, International Application No. PCT/IL2019/050553, dated Aug. 25, 2019.
(Continued)

*Primary Examiner* — Suhail Khan
(74) *Attorney, Agent, or Firm* — The Roy Gross Law Firm, LLC; Roy Gross

(57) ABSTRACT

A system and method for triggering a handover in cellular networks based on throughput of data in a User Equipment (UE). The UE manipulates at least one measured quantity that affects a decision of a base station to trigger the Handover of the UE to a neighboring Base Station, and send a handover request message that include the manipulated measured quantity.

15 Claims, 9 Drawing Sheets

(51) Int. Cl.
    *H04B 17/318*     (2015.01)
    *H04W 76/27*     (2018.01)
    *H04W 24/08*     (2009.01)
    *H04W 36/30*     (2009.01)

(56) References Cited

U.S. PATENT DOCUMENTS

| | | |
|---|---|---|
| 8,478,274 B2 | 7/2013 | Kato et al. |
| 8,902,853 B2 | 12/2014 | Kruglick |
| 2003/0002460 A1 | 1/2003 | English |
| 2006/0029021 A1 | 2/2006 | Sakawa et al. |
| 2009/0154425 A1 | 6/2009 | Patil et al. |
| 2013/0303168 A1* | 11/2013 | Aminzadeh Gohari ............ H04W 36/0088 455/436 |
| 2014/0113630 A1 | 4/2014 | Vangala et al. |
| 2016/0198385 A1* | 7/2016 | Braun ............ H04W 36/0094 455/437 |

OTHER PUBLICATIONS

International Preliminary Report on Patentability, International Application No. PCT/IL2019/050553, dated Feb. 25, 2020.

\* cited by examiner

SYSTEMS AND METHODS FOR TRIGGERING A HANDOVER IN WIRELESS COMMUNICATION NETWORKS

CROSS REFERENCE TO RELATED APPLICATIONS

This application is a National Phase of PCT Patent Application No. PCT/IL2019/050553 having International filing date of May 16, 2019, which claims the benefit of priority of Israeli Application No. 260171 filed on Jun. 20, 2018. The contents of the above applications are all incorporated by reference as if fully set forth herein in their entirety.

FIELD OF THE INVENTION

The present invention generally relates to the field of telecommunications. More specifically, the present invention relates to methods for triggering a handover in wireless communication networks.

BACKGROUND

Cellular communication networks enable voice and data communication between multiple users that connect to the network with their User Equipment (UE) that may be any computerized device that has the means to connect with the network (e.g., smartphones, Cellular communication enabled laptops, etc. . . . ).

Modern cellular networks such as those that follow a Long Term Evolution (LTE) architecture employ a plurality of geographically dispersed interconnected Base Stations (BS), e.g., eNodeB of the LTE architecture, for providing cell coverage to the various UE using the cellular communication network.

When a user moves between the coverage perimeter of two BSs, cellular network control devices of the cellular communication network will trigger a handover procedure for transferring the UE from one BS to a neighbor BS with better radio frequency (RF) signal reception.

The decision to trigger the handover procedure is made by the connected BS, e.g., an active BS. The decision is based on measurements of various known variables such as, for example, a Reference Signal Received Power (RSRP) and a Reference Signal Received Quality (RSRQ), performed by the UE. Generally speaking, the BS shall make a handover decision when the quantity of the measured variable(s), e.g., measured cellular communication network parameters, may meet a certain predefined threshold level, which maintains for a certain predefined length of time.

The problem with the cellular communication network as described above is that the cellular communication networks that follow the LTE architecture measure quantities of RSRP constitute an average of reference signal power received from all resource elements over a measured frequency bandwidth.

As can be seen, the UE basically measures received signal power. Although this approach may assist in triggering a handover when the reception of the RF signal is low due to such factors as, for example, geographical distance from the connected BS and weather conditions, this approach does not consider actual data throughput as measured by the target UE.

The described shortcoming may cause various problems in several usage scenarios. For example, during largescale local events such as terror attacks, many users make voice calls and/or stream video and/or data calls using their UE. Due to the local nature of the event, the users are connected to a limited number of BS, straining the data bandwidth resources of the active BS and providing only a limited quantity of data throughput to each active UE.

For example, the active BS will not trigger a handover since the measured quantities of RSRP are not affected by the amount of active UE.

While this approach assists at conserving UE batteries and at lowering the broadcasting signal strength, in certain situations, it falls short at providing a constant experience for the user.

In light of the above description of the current state of the art, it is clear that there is a long-standing need for a solution that employs a different approach to resolve the issues and deficiencies in existing attempted solutions in the field.

SUMMARY OF THE PRESENT INVENTION

The present invention relates to methods for triggering a handover in cellular networks.

A system for triggering a handover in a wireless network is provided. The system comprising a plurality of base stations (BSs) and a user equipment (UE) comprising processor circuitry, the processor circuitry is configured to:

monitor a throughput level of data transaction between the wireless network to the UE and receive at least one measured quantity from an at least one BS of the plurality of BSs;

identify a handover event where said throughput level of the data received by the UE is below a predetermined throughput level threshold; and trigger a handover to transfer said UE from a first BS to a second BS of said plurality of BSs, by sending a manipulated handover request message, wherein the manipulated handover request message is manipulated to conform with an at least one predefined condition to initiate a handover of said UE from the first BS to the second BS.

It is understood from the present disclosure that the invention solves the described shortcomings in the field of the art. More specifically, the present invention enables a User Equipment to dictate triggering of a handover when data throughput is low, in contrast to the present approach that ignores actual data throughput in handover decisions that are limited to factors of received signal power.

BRIEF DESCRIPTION OF THE DRAWINGS

Embodiments and features of the present invention are described herein in conjunction with the following drawings.

DETAILED DESCRIPTION

Figure 1:
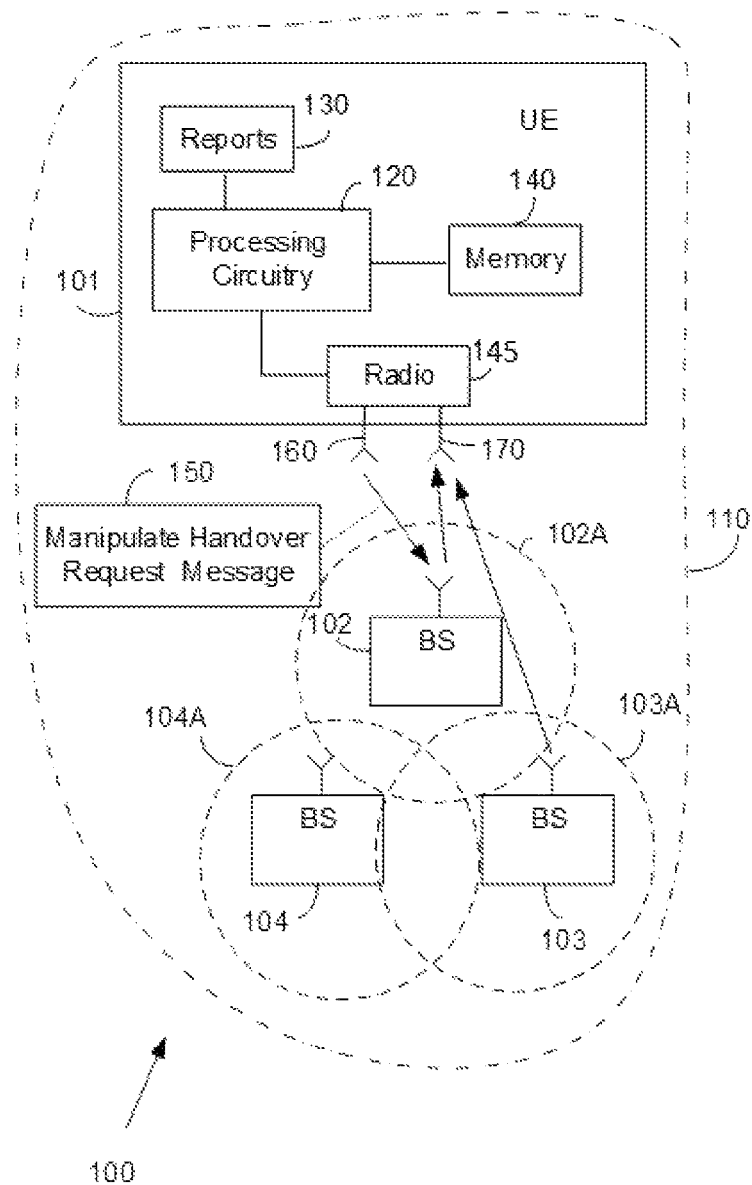
FIG. 1 is a diagram depicting a cellular communication network configuration.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Before we follow with the description of the system, it should be mentioned that although the operation and configuration of the inventive systems and methods will be described in light of a cellular communication network, e.g., cellular communication network, there is no intention to limit embodiments described herein below to the cellular communication network, e.g., cellular communication network, and that the methodology and configuration of some demonstrative embodiments may be applicable and compatible with other systems, known and such that are not yet known at the time of this disclosure, as long as such cellular communication network perform handover procedures between two or more BSs based on reports and/or messages generated by the UE based on one or more signal measurements of a wireless medium.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to, imply that the objects so described must be in a given sequence, either temporally, spatially, in ranking, or in any other manner.

Some embodiments may be used in conjunction with various devices and systems, for example, an Internet of things device (IoT), a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, the circuitry may include logic, at least partially operable in hardware.

The term "module" may refer, for example, to computing logic embedded in circuitry of a computing apparatus and/or computing logic stored in a memory of a computing apparatus. For example, the module may be accessible by a processor of the computing apparatus to execute the computing logic to perform computing functions and/or operations. In one example, the module may be embedded in various types of memory and/or firmware, e.g., silicon blocks of various chips and/or processors. The module may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. The module may be executed by one or more processors using memory, e.g., registers, stuck, buffers, and/or the like, coupled to the one or more processors, e.g., as necessary to execute the module.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

FIG. 1 illustrates a system 100 of, for example, a cellular communication network, for triggering a handover in a wireless network 110, in accordance to some demonstrative embodiments. In some demonstrative embodiments, system 100 can include an LTE architecture and/or an LTE advanced architecture.

In some demonstrative embodiments system for triggering a handover in a wireless network comprising a plurality of base stations (BSs), e.g., BSs 102, 103 and 104, and a user equipment (UE) 101. For example, UE 101 can include processor circuitry 120.

In some demonstrative embodiments, processor circuitry 120 can be configured to monitor a throughput level of data transaction between wireless network 110 to UE 101 and receive at least one measured quantity from an at least one BS, e.g., BS 102 of the plurality of BSs, e.g., BSs 102, 103 and 104.

In some demonstrative embodiments, processor circuitry 120 can be configured to identify a handover event. For example, the handover event can occur when the throughput level of the data received by UE 101 can be below a predetermined throughput level threshold.

In some demonstrative embodiments, processor circuitry 120 can be configured to trigger the handover to transfer UE 101 from BS 102 to BS 103 by sending a manipulated handover request message 150. For example, manipulated handover request message 150 can be manipulated to conform with an at least one predefined condition to initiate the handover of UE 101 from BS 102 to BS 103. In some other demonstrative embodiments, processor circuitry 120 can be configured to trigger the handover to transfer UE 101 from BS 102 to BS 104, or from BS 103 to BS 102 or BS 104, or from BS 104 to BS 103 or BS 102, or to transfer UE 101 from any BS to any other BS.

In some demonstrative embodiments, processor circuitry 120 can be configured to read a set of reports of measurements 130 over a predefined period of time of the at least one measured quantity and to withhold from being reported to wireless network 110. Processor circuitry 120 can be configured to generate a manipulated set of reports 130 by manipulating the at least one measured quantity to conform with the at least one predefined condition at the set of reports, send the manipulated handover request message 150, including the manipulated set of reports when the handover event of throughput falling below a predetermined threshold, and send a handover message including the set of reports 130, when the handover event of throughput can conform with the at least one predefined condition to initiate the handover.

In some other demonstrative embodiments, processor circuitry 120 can be configured to repeat the actions of monitor, identify and manipulate the at least one measured quantity so the handover can be triggered to a different BS, e.g., BS 103, of the plurality of BSs 102, 103 and 104, that not yet selected, until one of the different BS, e.g., BS 103 or 104 having a throughput above said predetermined threshold is selected.

In some demonstrative embodiments, processor circuitry 120 can be configured to, when all the BS of the plurality of BSs have throughput below said predetermined threshold, the said a manipulated handover request message to a BS with a highest data throughput.

In some demonstrative embodiments, processor circuitry 120 may include a throughput monitoring module (not shown). For example, the throughput monitoring module can be configured to monitor a throughput level of data transactions between UE 101 and BS 102. In other examples, the throughput monitoring module can be configured to monitor a throughput level of data transaction between UE 101 and BS 103 and/or BS 104 and/or BSs 102, 103, and 104. The throughput monitoring module can be implemented by hardware or by software and/or any combination of hardware and software.

In some demonstrative embodiments, processor circuitry 120 may include a handover decision module (not shown). For example, the handover decision module can be configured to trigger a handover based on the handover event. For example, the handover event can occur when a data throughput level is under a predetermined threshold. The handover decision module can be implemented by hardware or by software and/or any combination of hardware and software.

In some demonstrative embodiments, processor circuitry 120 may include a measured quantity manipulation module (not shown) configured to generate at least one manipulated measured quantity to conform with said at least one predefined condition. The measured quantity manipulation module can be implemented by hardware or by software and/or any combination of hardware and software.

In some demonstrative embodiments, processor circuitry 120 may include a reports communication module (not shown). For example, the reports communication module can be configured to generate a manipulated set of reports comprising said at least one manipulated measured quantity. The reports communication module can be implemented by hardware or by software and/or any combination of hardware and software.

In some demonstrative embodiments, UE can include a smartphone, but this is an example that is not meant to limit the scope of the present invention in any way, so any other computerized device that has the means to connect with a cellular system is suitable.

In some demonstrative embodiments, UE can include memory storage 140, one or more antennas 160 170, Subscriber Identity Module (SIM) card reader (not shown), a radio 145 to transmit and receive RF signals and programs that use protocols that enable UE 101 to access and communicate with a wireless or cellular network 110. For example, in LTE cellular networks, UE 101 can be configured to communicate with the cellular network using a Radio Resource Control (RRC) protocol.

In some demonstrative embodiments, memory storage 140 may store the programs that use protocols that enable UE 101 to access and communicate with a wireless or cellular network 110, the software for triggering the handover based on the data throughput of a BS as measured by UE 101, the set of reports, the manipulated set of reports and etc.

In some demonstrative embodiments, BS 102, 103, 104 can be inter-connected with each other and may be physically located in different geographical locations. a BS, e.g., each BS, of BS 102, 103 and 104 can be configured with software and/or hardware and/or any combination of software and hardware to operate as an eNodeB as defined by the LTE and/or LTE advance standards. It should be mentioned that in other wireless or cellular communication network architectures, the base station may be configured to operate as nodes that are equivalent in role and function to that of the eNodeB.

Figure 2:
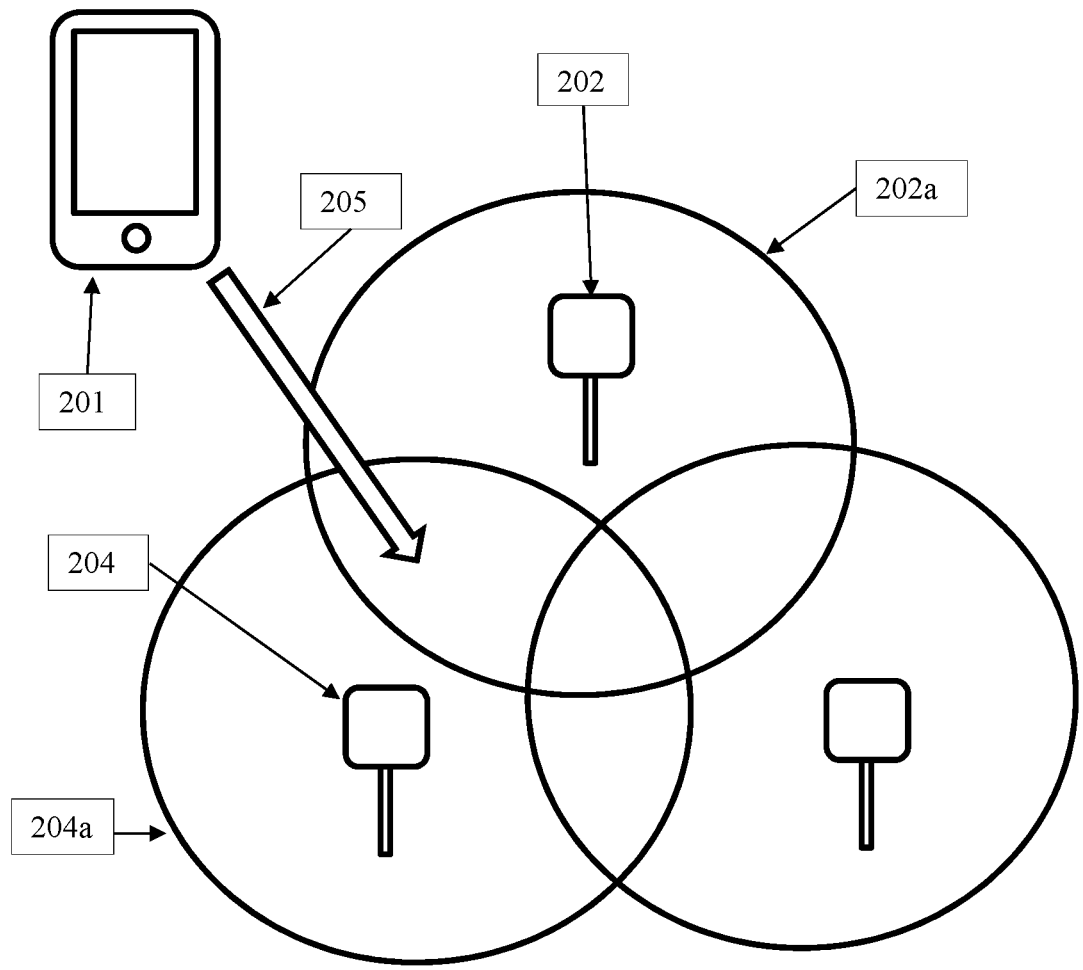
FIG. 2 is a diagram depicting a cellular communication network configuration.

In some demonstrative embodiments, a BS, e.g., BS 102 and/or BS 103 and/or BS 104, can transmit and receive with UE 101 in its own area, e.g., 102A, 103A, 104A, so the areas overlap each other. For example, UE 101 can be located in an area 102A covered by BS 102 and is in wireless communication with BS 102. In other embodiments, UE 101 can be in the area of other BS and communicate with the other BS FIG. 2 depicts a cellular communication network configuration, for example, an LTE and/or LTE advanced cellular communication network, in accordance with some demonstrative embodiments. In some demonstrative embodiments, the cellular communication network may include a UE 201 and BSs 202 and 204. In this example embodiment, UE 201 is in a different location than UE 101 of FIG. 1. UE 201 is now in a location 205 and in communication with BS 204.

In this example scenario, BS 202 may decide to perform a handover procedure to transfer UE 201 to BS 204. Although, it should be understood that the handover procedure to transfer UE 201 can be done with any other BS.

Figure 3:
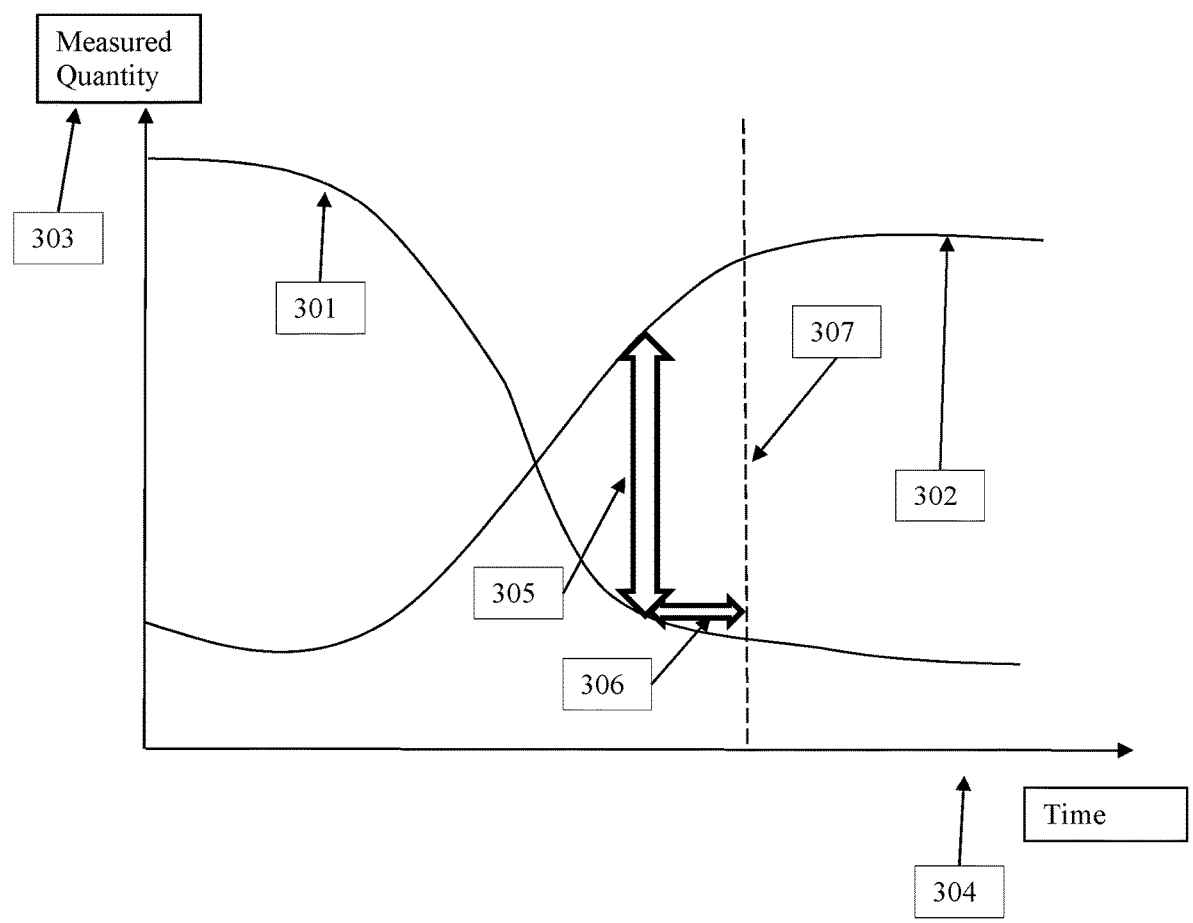
FIG. 3 is an illustration of graphs depicting measurements performed by a User Equipment (UE).

FIG. 3 shows two graphs depicting measurements performed by User Equipment, in accordance with some demonstrative embodiments. Each graph shows measurements of a Measured Quantity 303 of a desired network parameter performed over time 304 and reported to, for example, a network control device of the cellular communication network.

In some demonstrative embodiments, a graph 301 represents measured quantities over time, which may be measured on a signal received from an active BS, e.g., the BS which in communication with UE, while a graph 302 represents measured quantities, which may be measured on a signal received from a neighboring BS to the active BS.

In some demonstrative embodiments, in the cellular communication system, for example, LTE and/or LTE advance, the measured quantities 303 may include, for example, measurements of RSRP and/or RSRQ parameters. In other demonstrative embodiments, the measured quantities 303 may include measurements of other implementations of RSRP and/or other types of measurements altogether.

As can be seen in the example of FIG. 2, the measured quantity of active BS 301 diminishes over time, while the measured quantity of the neighbor BS 302 increases over time.

In some demonstrative embodiments, the LTE and/or other cellular communication networks can be configured to perform a handover when a difference 305 between the measured quantities of the graph 301 and graph 302 is higher than a certain predetermined threshold over a certain predetermined length of time 306.

In some demonstrative embodiments, when these conditions are met, a control device of the cellular communication network triggers a handover decision 307 and instructs the active and the neighbor BS to perform the handover procedure required to transfer the UE from the active BS, e.g., BS 102 (FIG. 1), to the neighbor BS, e.g., BS 104 (FIG. 1).

In some demonstrative embodiments, when the UE physically moves from the active BS, e.g., BS 102 (FIG. 1) towards the neighbor BS, e.g., BS 104 (FIG. 1). Although this approach considers signal power received from the BSs, it does not take into account the amount of available resources available at the active BS, e.g., BS 101 (FIG. 1) and neighbor BS, e.g., BS 104 (FIG. 1). Therefore, in the event that a large amount of UEs connects and becomes active with their local BS, the system resources of that BS are divided between all the active UEs.

Advantageously, some embodiments are configured to provide a single UE with the means, for example, software modules and/or hardware components and/or any combination of hardware and software, of performing the handover procedure, e.g., moving to a neighboring BS and thus, increasing the available data bandwidth and have a lower latency.

Figure 4:
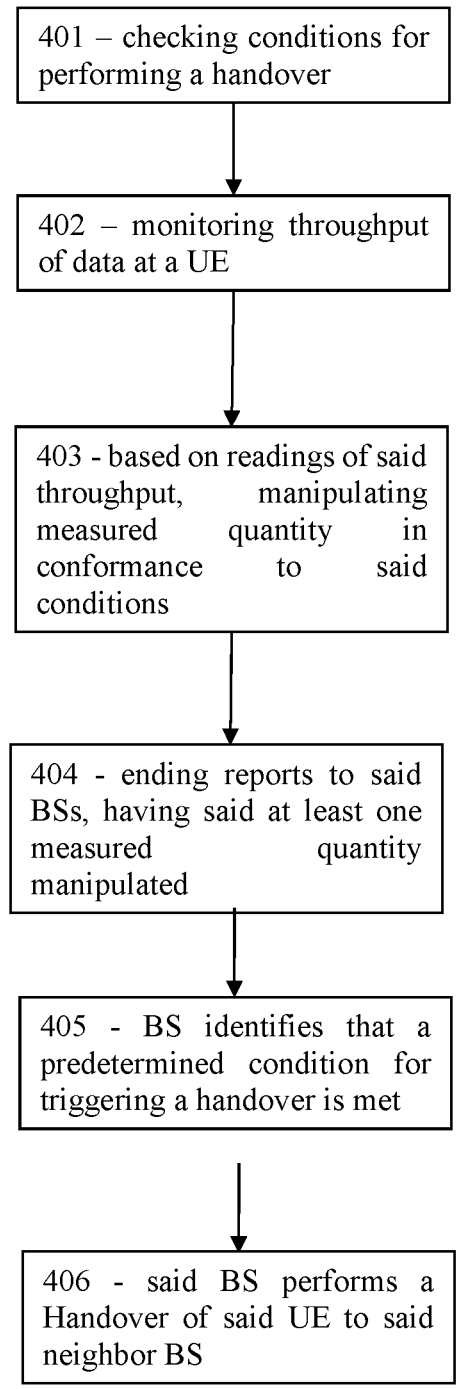
FIG. 4 is a flowchart of a method of triggering a handover in a wireless communication network.

FIG. 4 depicts a method for triggering a handover in cellular communication networks, in accordance to some demonstrative embodiments. In some demonstrative embodiments, the following method and the methods in this disclosure may be implemented, for example, as a set of operations programmed into a UE or into any computerized device intended to be in electronic communication with User Equipment. In other demonstrative embodiments, the following method and the methods in this disclosure may be implemented in hardware circuitry and/or as any combination of software with the hardware circuitry.

In some demonstrative embodiments, the method may start with checking conditions for performing a handover (text box 401). For example, the UE may send queries to the cellular network by using, for example, the RRC protocol. It is also contemplated that such conditions and identifications (IDs) of the cellular communication network are sent to a remote server and stored in a database therein for future reference by other UEs employing the cellular communication networks methods as described above.

The method may proceed by monitoring the throughput of data in a UE (text box 402). For example, monitoring throughput of data can be done by a program implemented as software, firmware, or hardware. The software or firmware may be installed and run on the UE, or in a computerized device in electronic communication with the UE. The program may be implemented using any of the various methods and algorithms are known in the art. Monitoring the data throughput may be performed periodically at predefined time intervals or aperiodically upon a certain predefined handover event or request.

In some demonstrative embodiments, based on readings of said throughput, manipulating at least one measured quantity in conformance to said conditions for performing a handover (text box 403). For example, manipulating the measured quantity is performed in the protocol used to communicate with the BS. In the case of LTE and/or LTE networks, the protocol may include the RRC protocol and/or other suitable protocols. In other cellular communication networks or other wireless communication networks any other suitable protocol can be used.

The method may proceed by sending one or more reports and/or one or more protocol messages to the active BS. For example, the one or more reports and/or one or more protocol messages include at least one manipulated measured quantity, so the active BS that is connected to the UE identifies that the conditions for triggering a handover are met (text box 404). For example, at least one manipulated measured quantity may include a manipulated RSRP and/or manipulated RSRQ and/or any other manipulated parameter, which can cause triggering of the handover of the UE. In other demonstrative embodiments, with other cellular communication networks and/or wireless communication networks the at least one manipulated measured quantity may include any other manipulated parameter.

The method ends when the BS performs a handover of the UE to the neighbor BS (text box 405).

Figure 5:
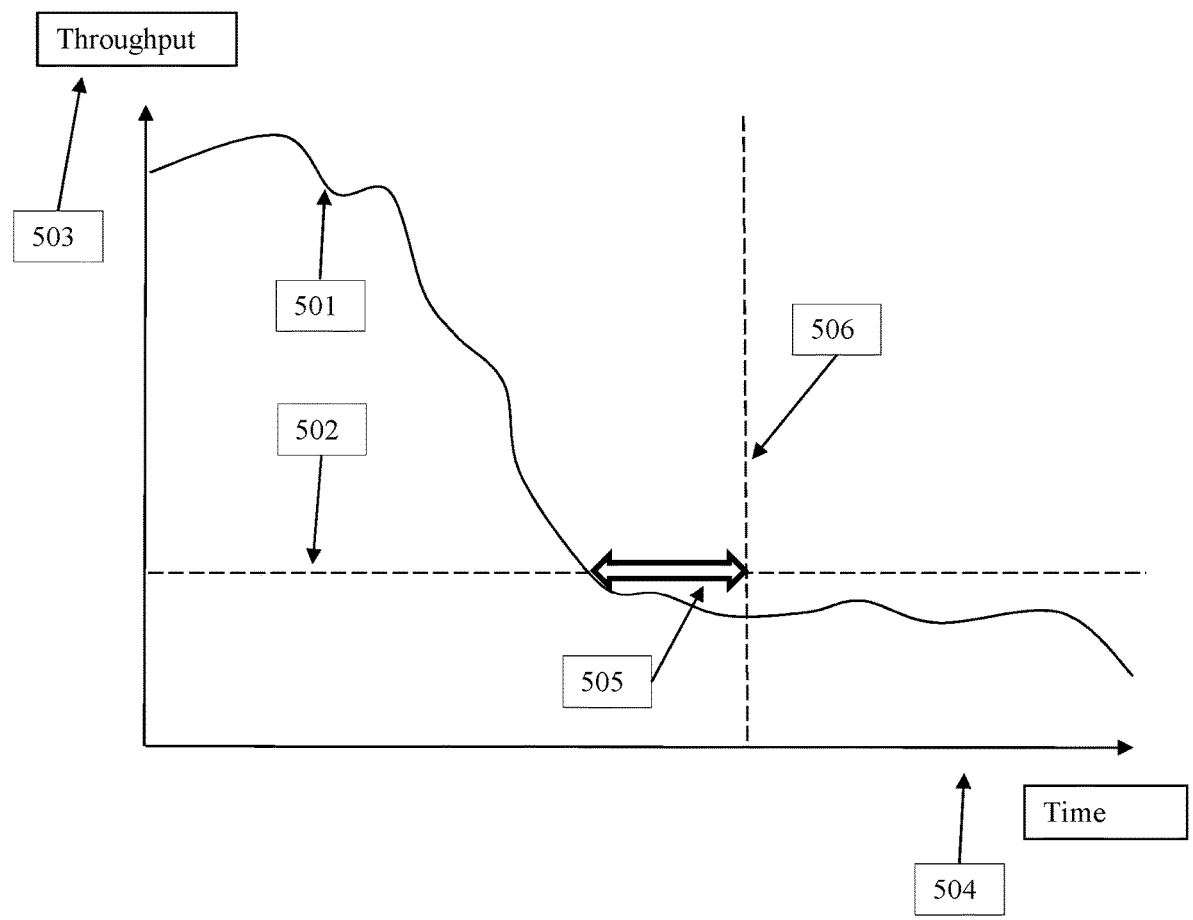
FIG. 5 is an illustration of a graph depicting measurements performed by a User Equipment.

FIG. 5 shows a graph 501 depicting measurements of data throughput 503 performed over time 504, in accordance with some demonstrative embodiments.

As can be seen with this example, the measured throughput of data transacted with the active BS diminishes over time, e.g., graph 501.

In some demonstrative embodiments, when the measured throughput, e.g., as is shown by graph 501, is lower than a certain predetermined threshold 502 over a certain predetermined length of time 505, the UE, e.g., the UE which communicate with the active BS, may start manipulating readings of measured quantities of at least some parameters, such as, for example, RSRP and/or RSRQ parameters, so the cellular communication network can trigger a handover decision 506 and can perform the procedure required to transfer the UE from the active BS to the neighbor BS.

Figure 6:
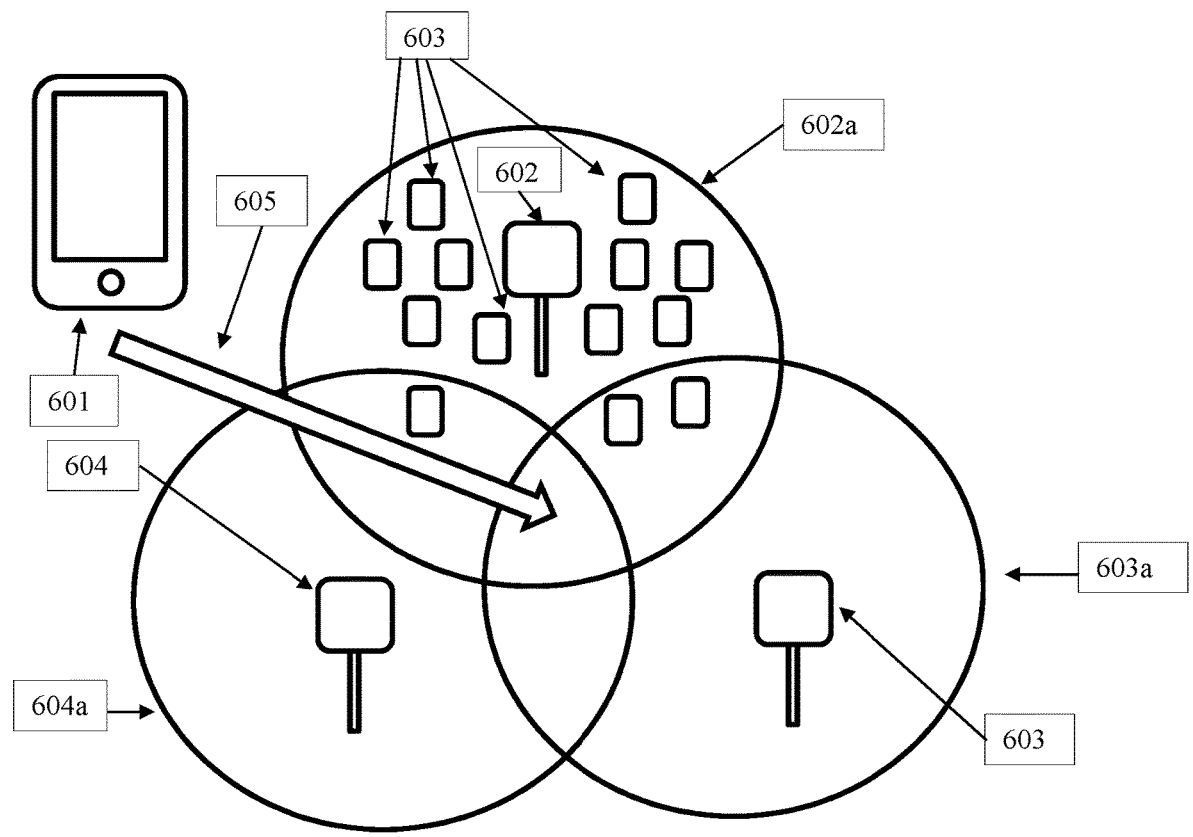
FIG. 6 is a diagram depicting a cellular communication network configuration.

FIG. 6 depicts a wireless communication system configured according to an LTE architecture and/or an LTE advanced architecture, in accordance with some demonstrative embodiments.

In some demonstrative embodiments, the wireless communication system may include UE 601, BSs 602, 603, and 604 and plurality of UEs 606, which can be in communication with BS 602, e.g., an active BS. For example, UE 601 is located in a location 605. In location 605 UE 601 can be under coverage area 602a of BS 62, cover area 603a of BS 603, and coverage area 604 of BS 604.

In this example embodiment, UE 601 can receive signals from BS 602, e.g., active Base Station 602, and a first and second neighboring BSs, e.g., BSs 603 and 604, although the condition to perform a handover to any of the neighboring Base Stations are not met.

A can be seen, a large amount of other UEs 606 are wirelessly connected to BS 602, so the system resources of BS 602 can be divided between the plurality UE 606 and UE 601, and the data throughput to the UE 601 can be diminished below a certain predefined threshold as described above with FIG. 5.

Figure 7:
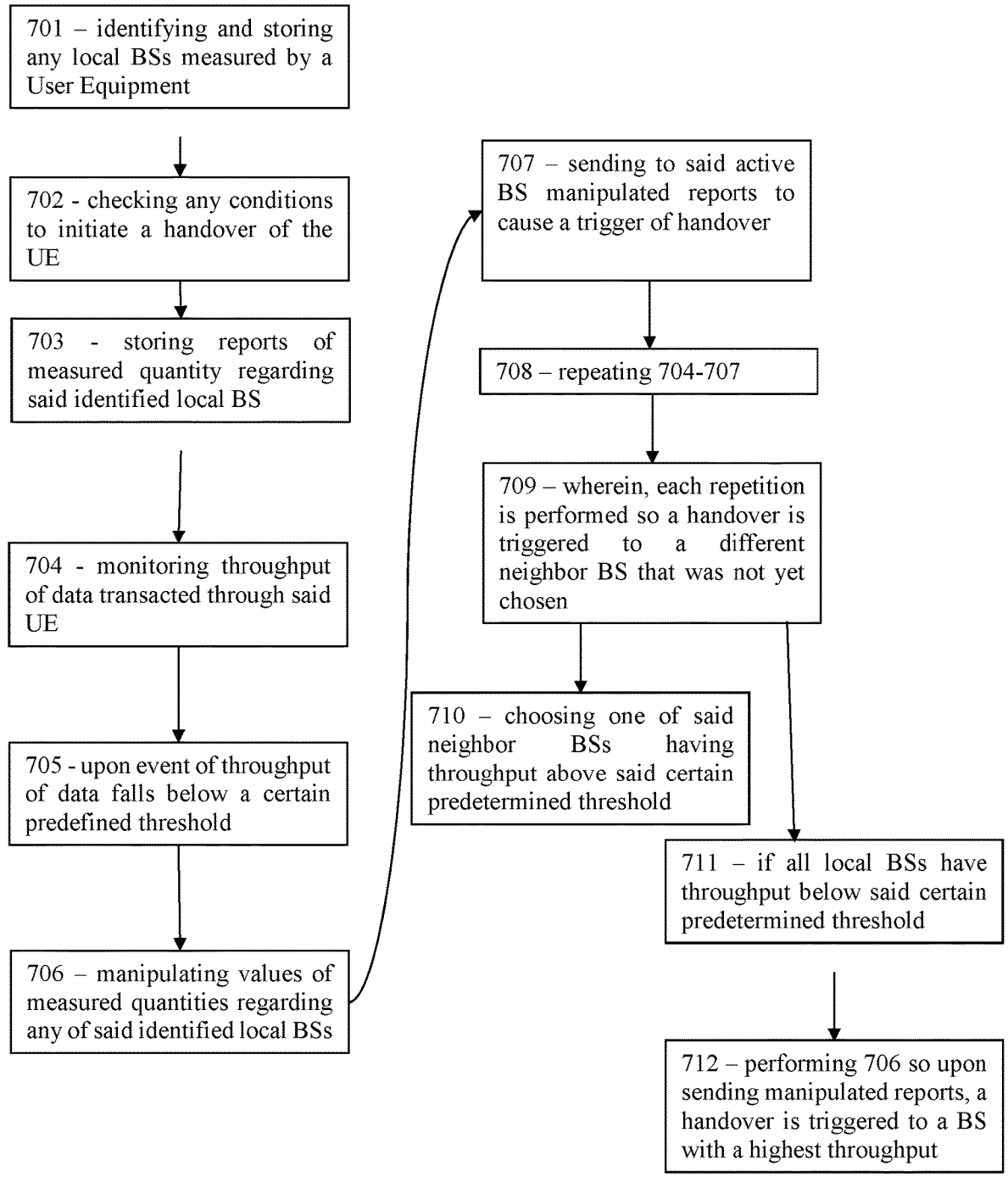
FIG. 7 is a flowchart of a method of the present invention.

FIG. 7 depicts a method for triggering a handover, in accordance with some demonstrative embodiments. In some demonstrative embodiments, the method may start with a UE, e.g., UE 601 (FIG. 6) identifying and storing in a memory, any local BSs, e.g., a list of BSs, measured by the UE, wherein the list consist of an active BS and any neighbor BSs (text box 701). The UE checks and stores in a memory any conditions to initiate a handover of the UE (text box 702). The UE stores in the memory reports of at least one Measured Quantity regarding said identified local BSs (text box 703).

In some demonstrative embodiments, the UE, e.g., UE 601 (FIG. 6), can monitor and record the throughput of data transacted through the UE (text box 704). Upon a handover event where said throughput of data falls below a certain predefined threshold (text box 705), the UE manipulates in said stored reports values of measured quantities regarding any of said identified local BSs (text box 706), then sends to said active BS manipulated reports so the active BS can trigger a handover (text box 707).

For example, in the case of LTE/LTE advance networks, the reports are formatted to comply with RRC protocol and can be sent as messages to the active BS, although it should be stated that this is an illustrative example and should not be interpreted to limit the scope of the discloser to LTE networks.

In some demonstrative embodiments, the method as described above can be repeated for each BS, e.g., neighbor BSs, so a handover can be triggered to a different neighbor BS that was not yet chosen (text box 709) until choosing one of said neighbor BS having throughput above said certain predetermined threshold (text box 710).

In other demonstrative embodiments, after performing a handover to all local BSs, it can be determined that all local BSs have throughput below said certain predetermined threshold (text box 711), the UE can manipulate values of measured quantities in the reports, so upon sending the manipulated reports, a handover is triggered to a BS with the highest throughput (text box 712).

Figure 8:
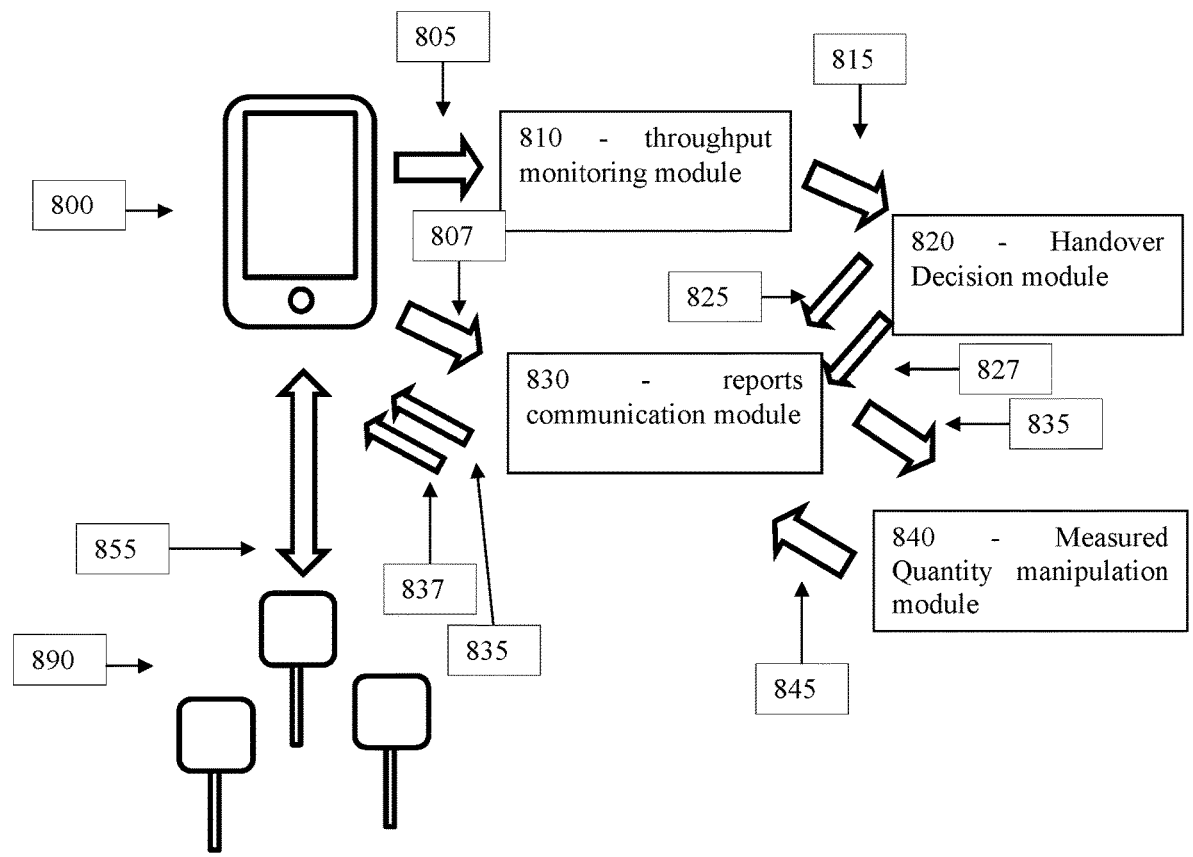
FIG. 8 is a diagram depicting a system of triggering a handover in a wireless communication network.

FIG. 8 depicts a cellular communication network configured to trigger a handover in a cellular communication network based on a data throughput indication, in accordance with some demonstrative embodiments.

In some demonstrative embodiments, the cellular communication network can include a UE 800. For example, UE 800 may include processing circuitry, memory storage circuitry, and a transceiver operably coupled to two or more antennas (not shown) a configured to transceiver radio frequency (RF) signal according to one or more cellular standards, such as, for example, LTE, LTE advance and/or any other cellular standard.

In some demonstrative embodiments, the cellular communication network can include a cellular subnetwork 890. For example, cellular subnetwork 890 can include a plurality of BSs configured to communicate with the UE, e.g., UE 800.

In some demonstrative embodiments, the cellular communication network can include a throughput monitoring module 810. For example, the throughput monitoring module 810 can be configured to monitor and record the throughput of data in the UE, e.g., UE 800.

In some demonstrative embodiments, the cellular communication network can include a handover decision module 820. For example, the handover decision module 820 can be configured to identify a need for handover events where the throughput of data is below a certain predefined threshold and to trigger manipulation of at least one measured quantity, e.g., RSRP and/or RSRQ parameters, that affects a decision of a BS to trigger a handover of UE 800 to a neighboring BS.

In some demonstrative embodiments, handover decision module 820 can be implemented by software, by hardware and/or any combination of hardware and software. For example, the functions of handover decision module 820 can be implemented by circuitry, e.g., hardware processing circuitry.

In some demonstrative embodiments, the cellular communication network can include a reports communication module 830. For example, reports communication module 830 can be configured to: check the BS for the conditions to initiate the handover, read and withhold a first set of reports of measurements of the at least one measured quantity, provide measured quantity manipulation module 840 with the first set of reports, receive a second set of reports that were manipulated by measured quantity manipulation module 830, and replace said first set of reports by the second set of reports for reporting to cellular communication subnetwork 890.

In some demonstrative embodiments, reports communication module 830 can be implemented by software, by hardware and/or any combination of hardware and software. For example, the functions of reports communication module 830 can be implemented by circuitry, e.g., hardware processing circuitry.

In some demonstrative embodiments, the cellular communication network can include a measured quantity manipulation module 840. For example, measured quantity manipulation module 840 is configured to manipulate the at least one measured quantity, e.g., RSRP and/or RSRQ parameters. For example, the measured quantities can be manipulated to conform with the conditions of the cellular communication network to initiate the handover.

In some demonstrative embodiments, measured quantity manipulation module 840 can be configured to manipulate the first set of reports to cause triggering of the handover by cellular subnetwork 890.

In some demonstrative embodiments, measured quantity manipulation module 840 can be implemented by software, by hardware and/or any combination of hardware and software. For example, the functions of measured quantity manipulation module 840 can be implemented by circuitry, e.g., hardware processing circuitry.

In some demonstrative embodiments, modules 810, 820, 830 and/or 840 and any functionality disclosed in the present disclosure may be part of a program installed as software on the UE, their functionality may be performed by the hardware processing circuitry of the UE. It is also contemplated that the functionality of these modules can be performed by at least one of a group that is consist of the following (not shown): a firmware in the UE, a hardware component in the UE, a computerized device in electronic communication with the UE by various known protocols, e.g., USB, Bluetooth, WiFi, NFC, etc., a service provided by the cellular network itself, and/or a web service running on a distant cloud server in electronic communication with the UE.

In some demonstrative embodiments, data flow between components can be, for example, as follows:

a. Information regarding throughput of data transmitted between UE 800 and cellular network 890 is monitored (arrow 805) by throughput monitoring module 810.

b. A first set of reports of measurements of at least one measured quantity over a certain period of time is read (arrow 807) by reports communication module 830 and withheld from being reported to cellular network 890.

c. When a handover event of said throughput of data falls below a certain predefined threshold occurs, which is identified (arrow 815) by handover decision module 820, the triggering (arrow 825) of reports by the communication module 830 to release (arrow 835) the first set of reports to measured quantity manipulation module 840 can happen.

d. A second set of reports over a period of time that were manipulated by measured quantity manipulation module 840 can be sent (arrow 845) to reports communication module 830.

e. Reports communication module 830 replaces (arrow 837) the first set of reports with the second set of reports for reporting to cellular network 890.

f. If a handover event of throughput below a certain threshold is not identified in the period of time (arrow 815) by handover decision means 820. Triggering (arrow 827) of reports communication module 830 to release (arrow 837) the first set of reports to cellular network 890 can happen.

Figure 9:
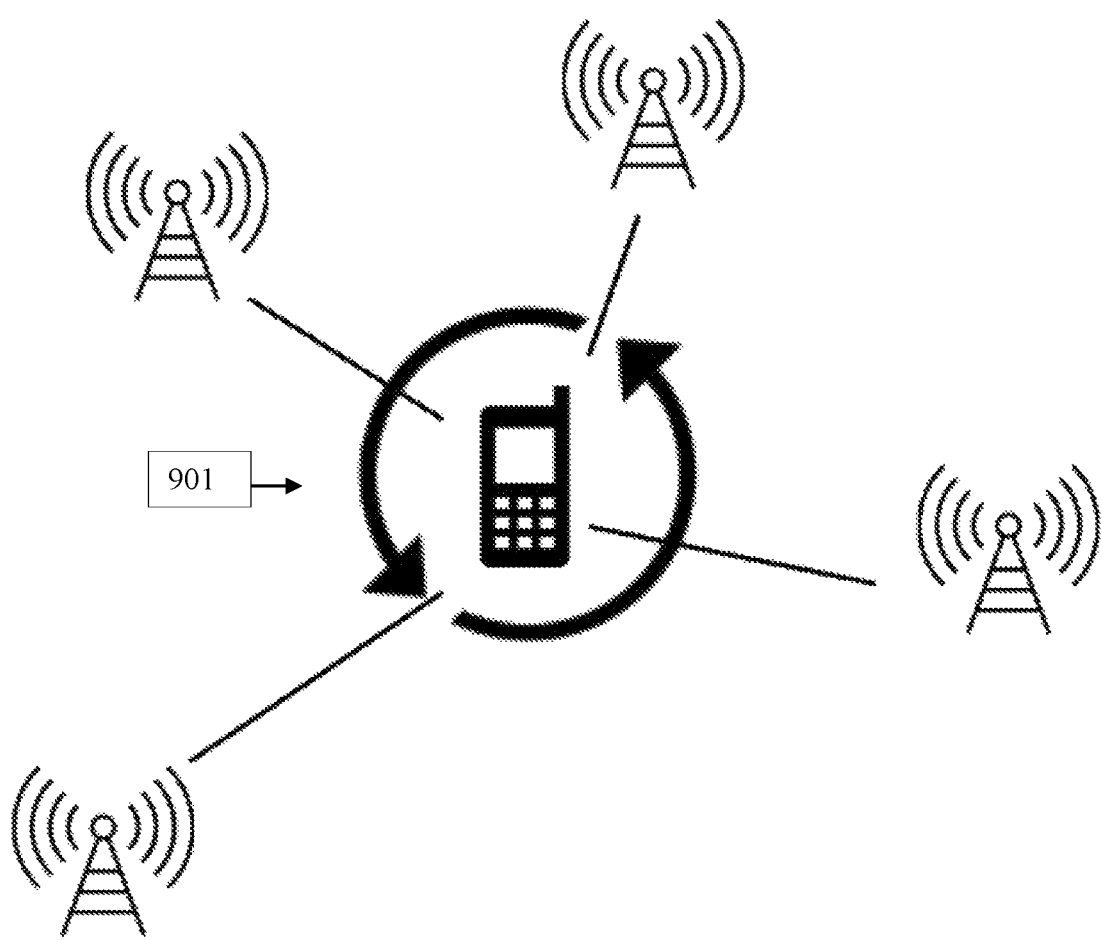
FIG. 9 is an illustration of a method of triggering a handover in a wireless communication network.

FIG. 9 illustrates another variation of the method depicted in FIG. 7, in accordance with some demonstrative embodiments. In this instance, the method depicted in FIG. 7 is arranged such that a handover is triggered subsequently (arrow 901) to all local BSs. For example, after performing a handover to the last BS, another triggering of a handover can be done to a local BS with a highest throughput monitored without considering the geographic location of the BS and/or a received signal strength of the local BS.

The foregoing description and illustrations of the embodiments of the invention have been presented for the purposes of illustration. It is not intended to be exhaustive or to limit the invention to the above description in any form.

Any term that has been defined above and used in the claims should be interpreted according to this definition.

The invention claimed is:

1. A system for triggering a handover in a wireless network comprising a plurality of base stations (BSs) and a user equipment (UE) comprising processor circuitry, the processor circuitry is configured to:

monitor a throughput of data transaction between said wireless network to the LIE and receive a throughput level;

receive at least one measured quantity from an at least one BS of the plurality of BSs, wherein the measured quantity does not include the throughput level;

identify a need to trigger a handover based on the throughput level of data transaction when said throughput level of the data received by the UE is below a predetermined throughput level threshold over a predetermined period of time; and periodically, cause a trigger of the handover to transfer said UE from an active BS to an unselected BS of said plurality of BSs of a Long-Term Evolution (LTE) cellular network by sending a manipulated handover request message, wherein the manipulated handover request message includes a manipulated set of reports to comply with a Radio Resource Control (RRC) protocol, until the unselected BS with the throughput level of data transaction above a throughput level of data transaction of other BSs of the plurality of BSs is selected.

2. The system of claim 1, wherein said processing circuitry is configured to:

read a set of reports of measurements over the predefined period of time of said at least one measured quantity and to withhold the set of reports from being reported to said wireless network;

generate the manipulated set of reports by manipulating said at least one measured quantity to conform with an at least one predefined condition at said set of reports;

send said manipulated handover request message comprising said manipulated set of reports when the throughput level is falling below a predetermined threshold; and send a handover message comprising said manipulated set of reports to report when said throughput level received by the UE is above or equal to said predetermined throughput level threshold and conform with said at least one predefined condition to initiate a handover.

3. The system of claim 1, wherein the processing circuitry is configured to:

when all the BSs of the plurality of BSs have throughput below said predetermined threshold, send said a manipulated handover request message to the unselected BS with a highest throughput level than the other base stations.

4. The system of claim 1, wherein the processing circuitry comprises:

a throughput monitoring module configured to monitor said throughput level of data transaction;

a handover decision module configured to trigger said handover based on said threshold level;

a measured quantity manipulation module configured to generate at least one manipulated measured quantity to conform with said at least one predefined condition; and a reports communication module configured to generate a manipulated set of reports comprising said at least one manipulated measured quantity.

5. The system of claim 1, wherein said at least one measured quantity of said manipulated set of reports comprising:

an at least one of Reference Signal Received Power (RSRP) and a Reference Signal Received Quality (RSRQ) measurements.

6. The system of claim 1, wherein actions that are configured in said processing circuitry comprising at least one of:

software installed on said UE, and run by said processor circuitry;

a firmware in said UE;

a hardware component in said UE;

a computerized device in electronic communication with the UE;

a service provided by said wireless network; and a web service run on a distant cloud server in electronic communication with said processing circuitry.

7. A method of triggering a handover in a Long-Term Evolution (LIE) cellular network, by a user equipment (UE), comprising:

monitoring a throughput of data transaction between an at least one base station of a plurality of base stations to the UE and receiving a throughput level;

receiving an at least one measured quantity from the at least one base station (BS) of the plurality of BSs, where the at least one measured quantity does not include the throughput level;

identifying a need to trigger a handover based on the throughput level when said throughput level received by said UE is below a predetermined throughput level threshold over a predetermined period of time; and periodically, causing, triggering of a handover to transfer said UE from an active BS to an unselected BS of said plurality of BSs, by sending a manipulated handover request message, wherein said manipulated handover request message includes a manipulated set of reports to comply with a Radio Resource Control (RRC) protocol until the unselected BS with the throughput level above a throughput of other unselected BSs of the plurality of BSs is selected.

8. The method of claim 7, comprising:

reading a set of reports of measured quantities over a predefined period of time of an at least one measured quantity and withhold said set of reports from being reported to said LTE cellular network;

generating the manipulated set of reports by manipulating an at least one measured quantity to conform with an at least one predefined condition at said set of reports;

sending said manipulated handover request message comprising said manipulated set of reports when the throughput level is falling below the predetermined throughput threshold; and sending a handover message comprising said set of reports when said throughput level received by the UE is above or equal to said predetermined throughput level threshold and conform with said at least one predefined condition to initiate said handover.

9. The method of claim 7, further comprising:

when all the BSs of the plurality of BSs have throughput below said predetermined threshold, send said a manipulated handover request message to a BS with a highest data throughput.

10. The method of claim 7, comprising:

storing received information to initiate said handover from said LTE cellular network pertaining to any conditions of said LTE cellular network to within at least one of a memory of said UE or in a database within a remote server for future reference by other UE connected to said LTE cellular network.

11. A user equipment (UE) for triggering a handover in a Long-Term Evolution (LTE) cellular network comprising a plurality of base stations (BSs), wherein said UE comprises processor circuitry, the processor circuitry is configured to:

monitor a throughput of data transaction between said LIE cellular network to the UE and receive a throughput level;

receive at least one measured quantity from an at least one BS of the plurality of BSs, where the at least one measured quantity does not include the throughput level;

identify a need to trigger a handover based on the throughput level when said throughput level of the data received by the UE is below a predetermined throughput level threshold over a predetermined period of time; and periodically, cause a trigger of the handover to transfer said UE from an active BS to an unselected BS of said plurality of BSs, by sending a manipulated handover request message, wherein the manipulated handover request message includes a manipulated set of reports to comply with a Radio Resource Control (RRC) protocol until the unselected BS with a throughput level above a throughput level other BSs of the plurality of BSs is selected.

12. The UE of claim 11, wherein said processing circuitry is configured to:

read a set of reports of measurements over a predefined period of time of said at least one measured quantity and to withhold the set of reports from being reported to said wireless network;

generate the manipulated set of reports by manipulating said at least one measured quantity to conform with an at least one predefined condition at said set of reports;

send said manipulated handover request message comprising said manipulated set of reports when the throughput is falling below the predetermined threshold level; and send a handover message comprising said set of reports to report when said throughput received by the UE is above or equal to said predetermined throughput level threshold and conform with said at least one predefined condition to initiate a handover.

13. The UE of claim 11, wherein the processing circuitry is configured to:

when all the BSs of the plurality of BSs have throughput below said predetermined threshold, send said manipulated handover request message to a BS with highest data throughput level.

14. The UE of claim 11, wherein the processing circuitry comprises:

a throughput monitoring module configured to monitor said throughput level of data transaction;

a handover decision module configured to trigger said handover based on said;

a measured quantity manipulation module configured to generate at least one manipulated measured quantity to conform with said at least one predefined condition; and a reports communication module configured to generate a manipulated set of reports comprising said at least one manipulated measured quantity.

15. The UE of claim 11, wherein said at least one measured quantity of said manipulated set of reports comprising:

an at least one of Reference Signal Received Power (RSRP) and a Reference Signal Received Quality (RSRQ) measurements.

* * * * *